United States Patent
Fwu et al.

(10) Patent No.: US 9,924,432 B2
(45) Date of Patent: Mar. 20, 2018

(54) LONG-TERM EVOLUTION DEVICE-TO-DEVICE DISCOVERY USING CONTROL CHANNEL

(71) Applicant: Intel Corporation, Santa Clara, CA (US)

(72) Inventors: Jong-Kae Fwu, Sunnyvale, CA (US); Seunghee Han, San Jose, CA (US); Hong He, Beijing (CN); Minh-Anh Vuong, San Jose, CA (US); Qinghua Li, San Ramon, CA (US); Apostolos Papathanassiou, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,998

(22) PCT Filed: Oct. 2, 2013

(86) PCT No.: PCT/US2013/063063
§ 371 (c)(1),
(2) Date: Dec. 17, 2013

(87) PCT Pub. No.: WO2014/070359
PCT Pub. Date: May 8, 2014

(65) Prior Publication Data
US 2015/0043438 A1 Feb. 12, 2015

Related U.S. Application Data

(60) Provisional application No. 61/721,436, filed on Nov. 1, 2012.

(51) Int. Cl.
*H04L 1/00* (2006.01)
*H04W 36/20* (2009.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
CPC . H04W 4/005; H04W 72/0413; H04W 8/005; H04W 72/04; H04W 72/12;
(Continued)

(56) References Cited

U.S. PATENT DOCUMENTS 8,504,086 B2 8/2013 So
8,885,458 B2 11/2014 Diachina et al.
(Continued)

FOREIGN PATENT DOCUMENTS

CN 104904137 A 9/2015
CN 105557032 A 5/2016
(Continued)

OTHER PUBLICATIONS

"U.S. Appl. No. 14/124,939, Preliminary Amendment filed Dec. 9, 2013", 9 pgs.
(Continued)

*Primary Examiner* — Salvador E Rivas
(74) *Attorney, Agent, or Firm* — Schwegman Lundberg & Woessner, P.A.

(57) ABSTRACT

Device-to-device (D2D) communications between user equipment (UE) allows two UEs in a long-term evolution (LTE) network to communicate directly with each other without the need to first send their communications to a network (such as via an evolved node B). In order to communicate in a D2D mode, the UEs first need to discover each other. One method of allowing the UEs to discover each other involves the use of a physical uplink control channel (PUCCH). After a network determines that certain UEs would benefit from D2D communication, the UEs can
(Continued)

be set up to send and receive discovery signals using the PUCCH.

23 Claims, 6 Drawing Sheets

(51) Int. Cl.

| | | |
|---|---|---|
| H04L 29/08 | (2006.01) | |
| H04W 28/24 | (2009.01) | |
| H04W 52/02 | (2009.01) | |
| H04W 24/08 | (2009.01) | |
| H04J 3/06 | (2006.01) | |
| H04L 5/00 | (2006.01) | |
| H04W 16/24 | (2009.01) | |
| H04W 8/00 | (2009.01) | |
| H04W 72/04 | (2009.01) | |
| H04W 76/02 | (2009.01) | |
| H04B 7/0417 | (2017.01) | |
| H04B 7/0452 | (2017.01) | |
| H04B 7/06 | (2006.01) | |
| H04W 28/02 | (2009.01) | |
| H04W 4/00 | (2018.01) | |
| H04W 76/04 | (2009.01) | |
| H04L 29/12 | (2006.01) | |
| H04W 16/20 | (2009.01) | |
| H04W 16/26 | (2009.01) | |
| H04W 60/04 | (2009.01) | |
| H04W 64/00 | (2009.01) | |
| H04W 36/14 | (2009.01) | |
| H04W 24/10 | (2009.01) | |
| H04W 28/04 | (2009.01) | |
| H04W 72/06 | (2009.01) | |
| H04W 72/08 | (2009.01) | |
| H04W 36/30 | (2009.01) | |
| H04W 72/12 | (2009.01) | |
| H04W 24/04 | (2009.01) | |
| H04J 11/00 | (2006.01) | |
| H04W 88/02 | (2009.01) | |
| H04W 88/08 | (2009.01) | |
| H04W 88/06 | (2009.01) | |
| H04W 88/16 | (2009.01) | |
| H04W 24/02 | (2009.01) | |

(52) U.S. Cl.
CPC .......... *H04B 7/0626* (2013.01); *H04J 3/0614* (2013.01); *H04J 11/00* (2013.01); *H04L 1/0027* (2013.01); *H04L 5/0046* (2013.01); *H04L 5/0048* (2013.01); *H04L 61/3005* (2013.01); *H04L 61/3075* (2013.01); *H04L 67/104* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04J 11/0023* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(58) Field of Classification Search
CPC . H04L 67/1068; H04L 1/0027; H04L 67/104; H04J 11/0023
See application file for complete search history.

(56) References Cited

U.S. PATENT DOCUMENTS

| | | |
|---|---|---|
| 8,917,702 B2 | 12/2014 | Wegmann et al. |
| 9,100,160 B2 | 8/2015 | Tarradell et al. |
| 9,225,399 B2 | 12/2015 | Shan et al. |
| 2001/0051994 A1 | 12/2001 | Serizawa et al. |
| 2008/0188247 A1 | 8/2008 | Worrall |
| 2010/0113060 A1 | 5/2010 | Bai et al. |
| 2011/0038279 A1 | 2/2011 | Cho et al. |
| 2011/0038326 A1 | 2/2011 | Davies et al. |
| 2011/0059744 A1 | 3/2011 | Won et al. |
| 2011/0110347 A1 | 5/2011 | Mun |
| 2011/0149728 A1 | 6/2011 | Lee |
| 2011/0190000 A1 | 8/2011 | Kwun |
| 2011/0300858 A1 | 12/2011 | Lee et al. |
| 2011/0310769 A1 | 12/2011 | Lee et al. |
| 2011/0319065 A1 | 12/2011 | Dalsgaard et al. |
| 2012/0083283 A1 | 4/2012 | Phan et al. |
| 2012/0106517 A1* | 5/2012 | Charbit ................ H04W 72/04 370/336 |
| 2012/0155406 A1 | 6/2012 | Kim et al. |
| 2012/0252518 A1 | 10/2012 | Karampatsis et al. |
| 2013/0051277 A1 | 2/2013 | Hakola et al. |
| 2013/0073671 A1* | 3/2013 | Nagpal ............... H04W 76/023 709/217 |
| 2013/0077484 A1 | 3/2013 | Zhao et al. |
| 2013/0077583 A1 | 3/2013 | Kim |
| 2013/0080597 A1 | 3/2013 | Liao |
| 2013/0195041 A1 | 8/2013 | Papasakellariou et al. |
| 2013/0196679 A1 | 8/2013 | Widell et al. |
| 2013/0301558 A1 | 11/2013 | Zakrzewski |
| 2013/0303206 A1 | 11/2013 | Starsinic et al. |
| 2014/0016614 A1 | 1/2014 | Velev et al. |
| 2014/0036795 A1 | 2/2014 | Martinez |
| 2014/0092733 A1 | 4/2014 | Johansson et al. |
| 2014/0094125 A1 | 4/2014 | Behravan et al. |
| 2014/0112194 A1* | 4/2014 | Novlan ................ H04W 8/005 370/254 |
| 2014/0113667 A1 | 4/2014 | Keller et al. |
| 2014/0119261 A1 | 5/2014 | Wang et al. |
| 2014/0120967 A1* | 5/2014 | Purnadi ............. H04W 72/1226 455/501 |
| 2014/0269779 A1 | 9/2014 | Shan et al. |
| 2015/0230234 A1 | 8/2015 | Choi et al. |
| 2015/0245221 A1 | 8/2015 | Yiu et al. |

FOREIGN PATENT DOCUMENTS

| | | |
|---|---|---|
| CN | 105637917 A | 6/2016 |
| EP | 2369883 A1 | 9/2011 |
| EP | 2915358 A1 | 9/2015 |
| KR | 1020120094369 A | 8/2012 |
| KR | 1020120096408 A | 8/2012 |
| WO | WO-2014070359 A1 | 5/2014 |
| WO | WO-2014070649 A1 | 5/2014 |
| WO | WO-2014070901 A1 | 5/2014 |
| WO | WO-2014070929 A1 | 5/2014 |

OTHER PUBLICATIONS

"U.S. Appl. No. 14/126,611, Preliminary Amendment filed Dec. 16, 2013", 11 pgs.
"Evaluation of MTC Device triggering", HTC, TD S2-110732, 3GPP TSG SA WG2 Meeting #83, (Feb. 2011), 2 pgs.

(56) References Cited

OTHER PUBLICATIONS

"International Application Serial No. PCT/US2013/063063, International Search Report dated Dec. 31, 2013", 5 pgs.
"International Application Serial No. PCT/US2013/063063, Written Opinion dated Dec. 31, 2013", 4 pgs.
"International Application Serial No. PCT/US2013/067043, International Search Report dated Feb. 25, 2014", 4 pgs.
"International Application Serial No. PCT/US2013/067043, Written Opinion dated Feb. 25, 2014", 6 pgs.
"International Application Serial No. PCT/US2013/067522, International Search Report dated Feb. 12, 2014", 3 pgs.
"International Application Serial No. PCT/US2013/067522, Written Opinion dated Feb. 12, 2014", 6 pgs.
"International Application Serial No. PCT/US2013/067575, International Search Report dated Feb. 21, 2014", 3 pgs.
"International Application Serial No. PCT/US2013/067575, Written Opinion dated Feb. 21, 2014", 6 pgs.
"Triggering a detached MTC device", InterDigital Communications, TD S2-110673, 3GPP TSG SA WG2 Meeting #83, (Feb. 2011), 4 pgs.
Doppler, Klaus, et al., "Device-to-Device Communication as an Underlay to LTE-Advanced Networks", IEEE Communications Magazine, 47(12), (Dec. 2009), 42-49.
Lei, Lei, et al., "Operator controlled device-to-device communications in LTE-advanced networks", IEEE Wireless Communications, 19(3), (Jun. 2012), 96-104.
"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).
"U.S. Appl. No. 14/126,611, Non Final Office Action dated Oct. 23, 2014", 10 pgs.
"The Mobile Broadband Standard", 3GPP List of Work Items, [Online] retrieved from the internet: <http://www.3gpp.org/DynaReport/WI-List.html>.
"U.S. Appl. No. 14/126,611, Final Office Action dated May 22, 2015", 11 pgs.
"U.S. Appl. No. 14/126,611, Response filed Jan. 23, 2015 to Non Final Office Action dated Oct. 23, 2014", 12 pgs.
"International Application Serial No. PCT/US2013/063063, International Preliminary Report on Patentability dated May 14, 2015", 6 pgs.
"International Application Serial No. PCT/US2013/067043, International Preliminary Report on Patentability dated May 14, 2015", 8 pgs.
"International Application Serial No. PCT/US2013/067522, International Preliminary Report on Patentability dated May 14, 2015", 8 pgs.
"International Application Serial No. PCT/US2013/067575, International Preliminary Report on Patentability dated May 14, 2015", 8 pgs.
"U.S. Appl. No. 14/124,939, Non Final Office Action dated Oct. 29, 2015", 31 pgs.
"Chinese Application Serial No. 201380051575.X, Voluntary Amendment mailed Dec. 21, 2015", not in English, 13 pgs.
"U.S. Appl. No. 14/126,611, Notice of Allowance dated Aug. 19, 2015", 12 pgs.
"U.S. Appl. No. 14/126,611, Response filed Jul. 24, 2015 to Final Office Action dated May 22, 2015", 9 pgs.
"U.S. Appl. No. 14/124,939, Final Office Action dated Jun. 17, 2016", 30 pgs.
"U.S. Appl. No. 14/124,939, Response filed Feb. 29, 2016 to Non Final Office Action dated Oct. 29, 2015", 15 pgs.
"Device Trigger Information", 3gpp Draft; S2-120650, 3rd Generation Partnership Project (3GPP), Mobile Competence Centre ; 650, Route Des Lucioles ; F-06921 Sophia-Antipolis Cedex ; France, vol. Sa W92, No. Vancouver, (Jan. 31, 2012).
"European Application Serial No. 13851603.4, Extended European Search Report dated Jul. 14, 2016", 11 pgs.
"MTC small data Identification mechanism for non-SMS Small Data Transmission Solution", 3GPP Draft; 52-114341_Mtc_Small_Data_Identification, 3rd Generation Partnership Project (3GPP), Mobile Competence Centre ; 650, Route Des Lucioles ; F-06921 Sophia-Antipolis Cedex ; France, (Oct. 4, 2011).
"Triggering procedure over Tsp", 3gpp Draft; 52-120558_Tsp_Trigger_Proc, 3rd Generation Partnership Project (3GPP), Mobile Competence Centre 650, Route Des Lucioles ; F-06921 Sophia-Antipolis Cedex France, vol. Sa Wg2, No. Vancouver, (Jan. 31, 2012).
"Update HSS based device trigger solution", 3GPP TSG SA WG2 Meeting #86: TD S2-113082, (Jul. 15, 2011), 5 pgs.
"U.S. Appl. No. 14/124,939, Advisory Action dated Oct. 26, 2016", 5 pgs.
"U.S. Appl. No. 14/124,939, Non Final Office Action dated Dec. 19, 2016", 37 pgs.
"U.S. Appl. No. 14/124,939, Response filed Mar. 20, 2017 to Non Final Office Action dated Dec. 19, 2016", 14 pgs.
"U.S. Appl. No. 14/124,939, Response filed Oct. 17, 2016 to Final Office Action dated Jun. 17, 2016", 10 pgs.
"U.S. Appl. No. 14/433,815, Non Final Office Action dated Feb. 9, 2017", 36 pgs.
- "European Application Serial No. 13851603.4, Response filed Feb. 13, 2017 to Extended European Search Report dated Jul. 14, 16", 15 pgs.
"Chinese Application Serial No. 201380051575.X, Response filed Jul. 20, 2017 to Office Action dated Apr. 1, 2017", w/English Claims, 18 pgs.
"U.S. Appl. No. 14/124,939, Response filed Sep. 22, 2017 to Final Office Action dated Jun. 23, 2017", 15 pgs.
"U.S. Appl. No. 14/433,815, Notice of Allowance dated Aug. 14, 2017", 9 pgs.

\* cited by examiner

| SR CONFIGURATION INDEX $I_{SR}$ | SR PERIODICITY (ms) | SR SUBFRAME OFFSET |
|---|---|---|
| 0 - 4 | 5 | $I_{SR}$ |
| 5 - 14 | 10 | $I_{SR} - 5$ |
| 15 - 34 | 20 | $I_{SR} - 15$ |
| 35 - 74 | 40 | $I_{SR} - 35$ |
| 75 - 154 | 80 | $I_{SR} - 75$ |
| 155 - 156 | 2 | $I_{SR} - 155$ |
| 157 | 1 | $I_{SR} - 157$ |

FIG. 6

LONG-TERM EVOLUTION DEVICE-TO-DEVICE DISCOVERY USING CONTROL CHANNEL

CROSS-REFERENCE TO RELATED APPLICATIONS

This application is a U.S. National Stage Application under 35 U.S.C. § 371 of PCT/US2013/063063, filed on Oct. 2, 2013, which claims priority to U.S. Provisional Patent Application Ser. No. 61/721,436, filed Nov. 1, 2012, which are incorporated herein by reference in their entirety.

TECHNICAL FIELD

Embodiments pertain to electronics. Some embodiments pertain to mobile electronic devices.

BACKGROUND ART

Proximity-based applications and services represent a fast growing social and technological trend that may have a major impact on the evolution of cellular wireless/mobile broadband technologies. These services are based on the awareness that two devices or two users are close to each other and, thus, may be able to directly communicate with each other. Proximity-based applications include social networking, mobile commerce, advertisement, gaming, etc. It is desirable to have a method of discovering when other devices capable of Device-to-Device (D2D) communication are in the proximity of a D2D capable device.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 6 is a table showing configuration index values and periodicity values of an exemplary embodiment.

DESCRIPTION OF THE EMBODIMENTS

Figure 1:
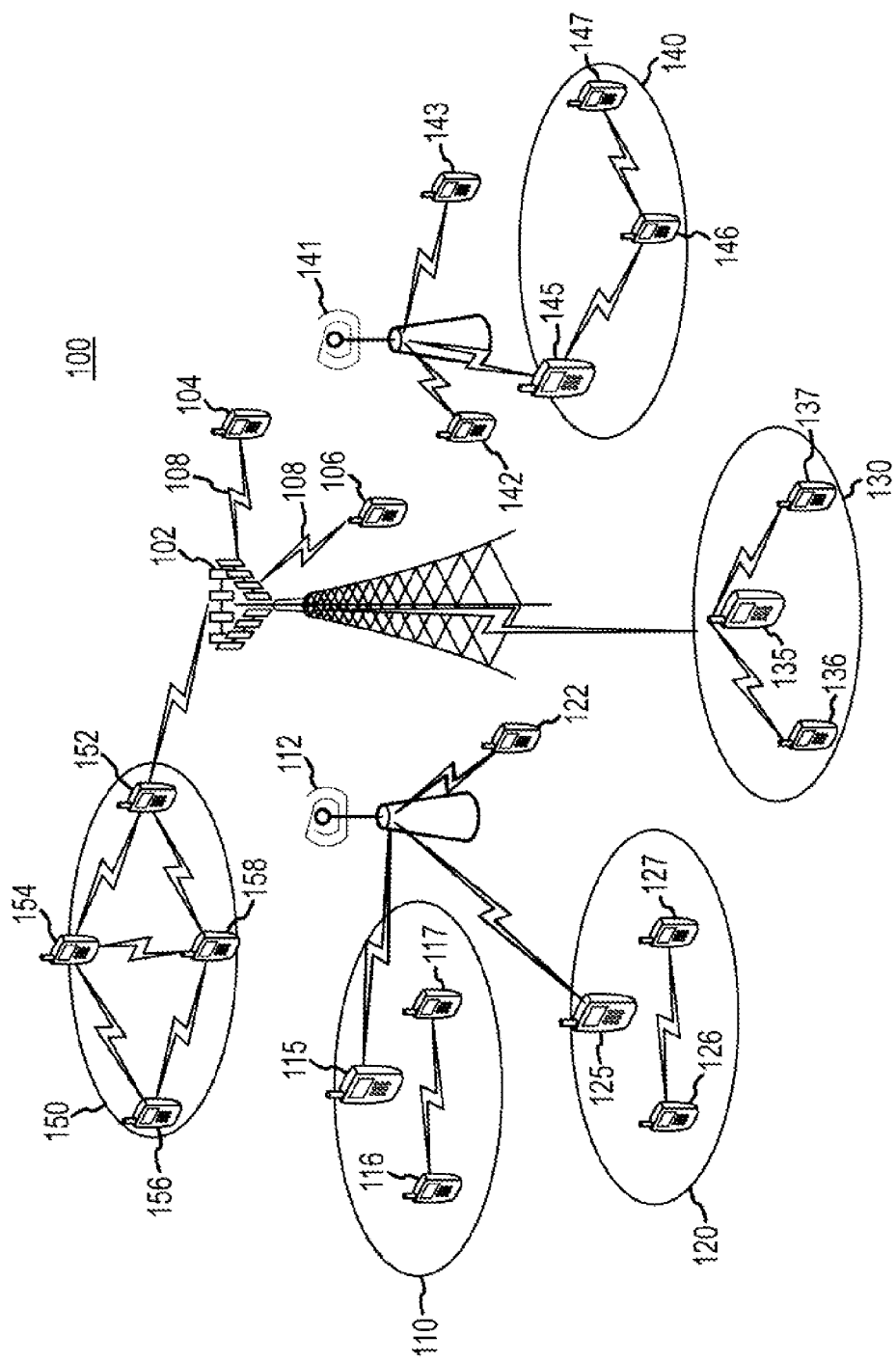
FIG. 1 is an exemplary network with multiple D2D couplings.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of devices" may include two or more devices.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA, and more popularly known simply as LTE) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies. An evolution to LTE, termed LTE Advanced, is also being developed to provide even further performance improvements.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

Mobile devices with the ability to communicate via cellular technologies, such as LTE and LTE Advanced, have become very prevalent in many countries throughout the world. These devices may include smart phones, tablets, e-readers, mobile hotspots, and the like. Traditionally, such devices communicate to other devices via the core network. For example, in a traditional communications network, such a communication commonly occurs by sending signals from a mobile device through a central coordinator, such as a base transceiver station, a Node B, or an Evolved Node B (eNodeB or eNB). However, there is an increasing desire to have devices communicate directly to each other, without the use of an eNB.

In an exemplary situation in which proximity-based applications or device-to-device (D2D) communications is used, a user with a mobile device, or user equipment (UE1) becomes physically close to another mobile device, UE2. A user may wish to transfer files, play a game, or otherwise communicate to UE2 from UE1. The connection between UE1 and UE2 may be automatically initiated by an application, instead of initiated by a user.

The D2D users may operate in a co-existing mode and reuse the spectrum with other cellular users, as shown in FIG. 1, described in further detail below. As described above, D2D users can communicate directly with each other or through hops of other D2D users. When D2D communication shares the same resources with the mobile broadband system, certain functions can still be controlled and coordinated by the eNB of the mobile broadband network, if centralized control offers more benefits.

FIG. 1 illustrates a system that combines a Device-to-Device ("D2D") network with a wireless access network, such as a Long Term Evolution (LTE) network. Mobile broadband network 100 includes a central coordinator, illustrated here as eNB 102. User equipment (UE) 104 and 106 communicate with eNB 102 via LTE communications channel 108.

Also illustrated in FIG. 1 are D2D clusters 110, 120, 130, 140, and 150. Each one of D2D clusters 110, 120, 130, 140, and 150 comprises a plurality of UEs that are capable of communicating directly with each other, without the need to communicate through eNB 102. This application may refer to a UE that has D2D capability as a dUE, to stand for D2D-capable User Equipment. In FIG. 1, several different layouts of D2D clusters are shown. It should be understood that other configurations of D2D clusters are also possible. It should also be understood that a single eNB can support many more D2D clusters than are shown in FIG. 1.

Pico eNB 112 is coupled to eNB 102. Coupled to pico eNB 112 are D2D clusters 110 and 120. Within D2D cluster 110 is a D2D coordinator 115 and dUEs 116 and 117. D2D coordinator 115 serves to manage the communications between dUEs 116/117 and pico eNB 112. Within D2D cluster 120 is a D2D coordinator 125 and dUEs 126 and 127.

Also coupled to pico eNB 112 is a UE 122. UE 122 is not coupled to D2D clusters 110 or 120. UE 122 may or may not have D2D capabilities.

dUEs 116 and 117 have a D2D connection with each other, where communications between dUE 116 and dUE 117 need not involve either pico eNB 112 or eNB 102. Instead, information is transmitted directly between dUE 116 and dUE 117. This set-up provides a variety of advantages. For example, because dUE 116 and dUE 117 are in close proximity to each other, they do not have to transmit data all the way to eNB 102—therefore, one or both devices can use a low-power transceiver mode, prolonging the battery lives of dUE 116 and dUE 117. In addition, because eNB 112 and eNB 102 are not involved in transmissions between dUE 116 and dUE 117, the finite bandwidth capabilities of eNB 102 and pico eNB 112 are not used for dUE 116 and dUE 117, allowing eNB 112 and eNB 102 to service other UEs. If either dUE 116 or dUE 117 needs to communicate to eNB 102 or pico eNB 112, such a communication may occur through D2D coordinator 115 or may be sent directly from dUE 116 or dUE 117 to eNB 112 or eNB 102. Although FIG. 1 illustrates several scenarios that involve the use of a D2D coordinator, it should be understood that communication between devices may be performed without any D2D coordinator.

A similar configuration is present in D2D cluster 120, between dUE 126 and dUE 127. It should be understood that there is a connection between D2D coordinator 115 and dUEs 116 and 117, it is merely omitted from FIG. 1.

D2D cluster 130 comprises D2D coordinator 135, dUE 136, and dUE 137. In D2D cluster 130, dUEs 136 and 137 may communicate directly with each other and with D2D controller 135. D2D coordinator 135 serves to control the D2D connection between dUE 136 and dUE 137. D2D 135 may also organize multicast/broadcast transmissions with dUE 136 or dUE 137. As above, dUEs 136 and 137 and D2D coordinator 135 free up the bandwidth of eNB 102 by using the same space as a single traditional UE. Unlike D2D clusters 110 and 120, there is no pico eNB coupled to D2D cluster 130. It should be understood that some D2D clusters may use a pico eNB and some may not. In addition, a pico eNB may be replaced with a femto eNB or other suitable small cell eNB.

D2D cluster 140 comprises pico eNB 141, dUEs 142 and 143; D2D controller 145; and dUEs 146 and 147. dUEs 142 and 143 are coupled to pico eNB 141, but are not coupled to any other UEs. D2D coordinator 145 is also coupled to pico eNB 142. dUEs 146 and 147 are in a multi-hop configuration—only dUE 146 is coupled to D2D controller 145. If pico eNB 141 wants to send data to dUE 146 it can send the data through D2D coordinator/controller dUE 145. If D2D controller 145 needs to send a signal to dUE 147, the signal is transmitted through dUE 146.

D2D cluster 150 comprises dUEs 152, 154, 156, and 158 coupled to each other in a mesh configuration, with each of the dUEs 152, 154, 156, and 158 coupled to each other as illustrated. If one dUE needs to send data to another dUE to which it is not directly coupled (e.g., if dUEs 152 needs to send data to dUE 156), it can send the data through a dUE that it is connected to (e.g., dUE 154). As with all connections illustrated in FIG. 1, a D2D controller may be used but is not necessary.

In order for one dUE to communicate with another dUE via D2D, the dUEs first have to discover the presence of other UEs that are capable of communicating via D2D. One method of discovering the presence of other UEs may be using a control channel. The LTE specification describes several different control channels. Among the uplink control channels described are the Physical Uplink Shared Channel (PUSCH), the Physical Random Access Channel (PRACH), and the Physical Uplink Control Channel (PUCCH).

The PUCCH carries control information regarding the uplink channel (a channel used to send data from a UE to the network, such as an eNB). For example, the PUCCH may be used to send a hybrid Automatic Repeat reQuest (hybrid ARQ) to send acknowledgements that indicate to the eNB whether downlink transport blocks were successfully received. The PUCCH may also be used to send channel-state reports to aid in downlink channel-dependent scheduling. The PUCCH may also be used to request resources to transmit uplink data. The PUCCH may also be used to send channel quality indicators (CQI) and MIMO feedback (such as rank indicator and precoding matrix indicator). The PUCCH may also be used to send a scheduling request (SR). The PUCCH may be used by a UE to send an SR to request resource allocation in the uplink (UL) so the UE can send data.

The physical uplink control channel (PUCCH) carries uplink control information. There are several different formats of the PUCCH, including formats 1, 1a, 1b, 2, 2a, 2b, and 3. Each format has a different modulation scheme and subframe length.

PUCCH Format 1 may be used for sending a positive Scheduling Request (SR). PUCCH formats 1a and 1b are used for HARQ acknowledgements (ACK). A UE may be configured to transmit the SR on one antenna port or two antenna ports. In typical usage, each UE in a cell is assigned a specific resource index mapping that can be used every nth frame in order to transmit a scheduling request. Therefore, if the eNB detects energy in the PUCCH, the eNB identifies the energy as a scheduling request. The eNB determines which UE sent the scheduling, as the modulation of the energy may indicate which UE sent the scheduling request. Since each UE in a cell typically has a specific resource or modulation allocated to it, there is no probability of a collision.

The structure of the SR PUCCH format 1 is based on a cyclic time shift of the base RS sequence modulated with time-domain orthogonal block spreading. The SR may be used for a UE to let an eNB know if there is any data that needs to be transmitted from the UE. Discontinuous Transmission (DTX) and Acknowledgement/Non-Acknowledgement (ACK/NACK) signaling. For example, the SR uses simple On-Off signaling with the same constellation point as is used for Discontinuous Transmission (DTX) and Acknowledgement/Non-Acknowledgement (ACK/NACK) signaling, such as a DTX/NACK or DTX/(NACK, NACK) for ACK/NACK transmission using PUCCH format 1a/1b to request a physical uplink shared channel (PUSCH) resource (positive SR transmission). The SR transmits nothing when it does not request to be scheduled (negative SR). Since the HARQ ACK/NACK structure is reused for the SR, different PUCCH resource indices (i.e., different cyclic time shift/orthogonal code combinations together with a Physical Resource Block (PRB) index) in the same PUCCH region can be assigned for SR (Format 1) or HARQ ACK/NACK (Format 1a/1b) from different UEs. This results in orthogonal multiplexing of SR and HARQ ACK/NACK in the same PUCCH region.

The following presents a more detailed explanation of the usage of PUCCH for scheduling requests.

A scheduling request is transmitted on the PUCCH resource(s):

$n_{PUCCH}^{(1,\tilde{p})} = n_{PUCCH,SRI}^{(1,\tilde{p})}$ for antenna port p, where $n_{PUCCH,SRI}^{(1,\tilde{p})}$ is configured by higher layers.

For PUCCH format 1, information is carried by the presence/absence of transmission of PUCCH from the UE.

In the remainder of this section, d(0)=1 shall be assumed for PUCCH format 1.

The complex-valued symbol d(0) shall be multiplied with a cyclically shifted length $n_{seq}^{PUCCH}=12$ sequence $r_{u,v}^{(\alpha_p)}(n)$ for each of the P antenna ports used for PUCCH transmission according to the formula:

$$y^{(\tilde{p})}(n) = \frac{1}{\sqrt{P}} d(0) \cdot r_{u,v}^{(\alpha_p)}(n),$$

$$n = 0, 1, \ldots, N_{seq}^{PUCCH} - 1$$

where $r_{u,v}^{(\alpha_p)}(n)$ is defined as $M_{sc}^{RS} = n_{seq}^{PUCCH}$. The antenna-port specific cyclic shift $\alpha_p$ varies between symbols and slots as defined below.

Resources used for transmission of PUCCH format 1, 1a and 1b are identified by a resource index $n_{PUCCH}^{(1,\tilde{p})}$ from which the orthogonal sequence index $n_{oc}^{(\tilde{p})}(n_s)$ and the cyclic shift $\alpha_p(n_s,l)$ are determined according to the formulas:

$$n_{oc}^{(\tilde{p})}(n_s) = \begin{cases} \lfloor n'_p(n_s) \cdot \Delta_{shift}^{PUCCH} / N' \rfloor & \text{for normal cyclic prefix} \\ 2 \cdot \lfloor n'_p(n_s) \cdot \frac{\Delta_{shift}^{PUCCH}}{N'} \rfloor & \text{for extended cyclic prefix} \end{cases}$$

$$\alpha_p(n_s, l) = 2\pi \cdot n_{cs}^{(\tilde{p})}(n_s, l) / N_{sc}^{RB}$$

$$n_{cs}^{(\tilde{p})}(n_s, l) =$$

$$\begin{cases} \left[ \begin{array}{l} n_{cs}^{cell}(n_s, l) + \\ \left( \begin{array}{l} n'_p(n_s) \cdot \Delta_{shift}^{PUCCH} + \\ (n_{oc}^{(\tilde{p})}(n_s) \bmod \Delta_{shift}^{PUCCH}) \end{array} \right) \bmod N' \end{array} \right] \bmod N_{sc}^{RB} & \text{for normal} \\ \left[ \begin{array}{l} n_{cs}^{cell}(n_s, l) + \\ \left( \begin{array}{l} n'_p(n_s) \cdot \Delta_{shift}^{PUCCH} + \\ n_{oc}^{(\tilde{p})}(n_s)/2 \end{array} \right) \bmod N' \end{array} \right] \bmod N_{sc}^{RB} & \text{for extended} \end{cases}$$

where:

$$N' = \begin{cases} N_{cs}^{(1)} & \text{if } n_{PUCCH}^{(1,p)} < c \cdot N_{cs}^{(1)} / \Delta_{shift}^{PUCCH} \\ N_{sc}^{RB} & \text{otherwise} \end{cases}$$

$$c = \begin{cases} 3 & \text{for normal cyclic prefix} \\ 2 & \text{for extended cyclic prefix} \end{cases}$$

The resource indices within the two resource blocks in the two slots of a subframe to which the PUCCH is mapped are given by the following formulas:

$$n'_p(n_s) = \begin{cases} n_{PUCCH}^{(1,p)}, & \text{if } n_{PUCCH}^{(1,p)} < c \cdot N_{cs}^{(1)} / \Delta_{shift}^{PUCCH} \\ (n_{PUCCH}^{(1,p)} - c \cdot N_{cs}^{(1)} / \Delta_{shift}^{PUCCH}) \bmod \left( c \cdot \frac{N_{sc}^{RB}}{\Delta_{shift}^{PUCCH}} \right) & \text{otherwise} \end{cases}$$

for $n_s \bmod 2 = 0$ and by $$n'_p(n_s) =$$

$$\begin{cases} \left\lfloor c(n'_p(n_s-1)+1) \right\rfloor \bmod \left( \frac{cN_{sc}^{RB}}{\Delta_{shift}^{PUCCH}} + 1 \right) - 1, \text{ for } n_{PUCCH}^{(1,p)} \geq c \cdot N_{cs}^{(1)} / \Delta_{shift}^{PUCCH} \\ \lfloor h_p/c \rfloor + (h_p \bmod c) V' / \Delta_{shift}^{PUCCH} \end{cases}$$

for $n_s \bmod 2 = 1$, where $$h_p = (n'_p(n_s-1)+d) \bmod \left( \frac{cN'}{\Delta_{shift}^{PUCCH}} \right),$$

with d=2 for normal CP and d=0 for extended CP.

For purposes of the discussion below, some of the descriptions assume the use of PUCCH format 1. However, it should be noted that any type of discovery signal using PUCCH may be used.

Figure 2:
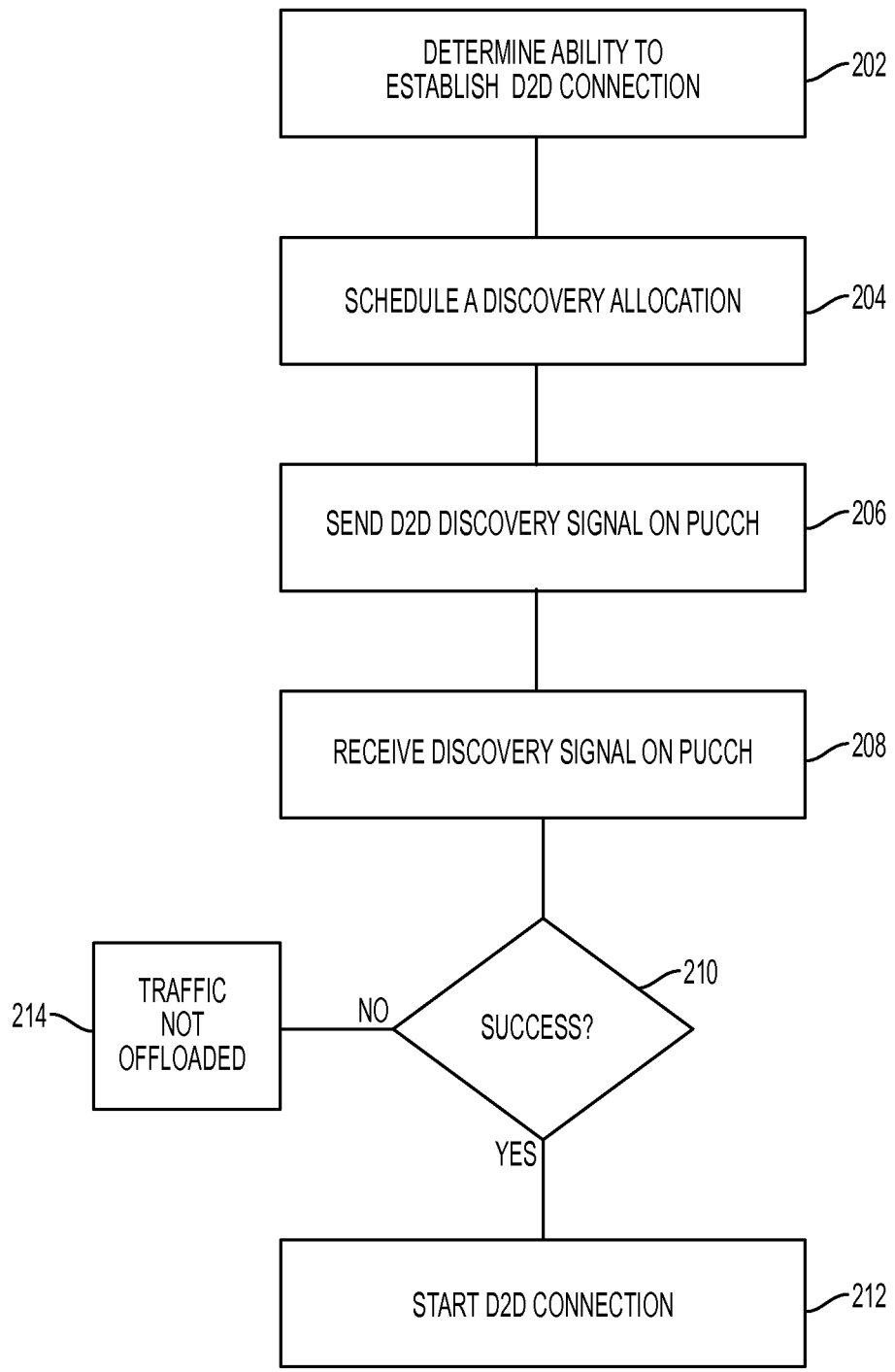
FIG. 2 is a flowchart illustrating the operation of an embodiment.

With reference to FIG. 2, a flowchart illustrating a method of D2D discovery is presented. For purposes of FIG. 2, assume that a D2D UE1 (dUE1) would like to discover its neighbor D2D UE2 (dUE2).

An eNB monitors the traffic between UEs and detects the possibility to offload some of these activities over to D2D communication between, e.g., dUE1 and dUE2 (202). This may be done in a variety of different manners. For example, many UEs have navigation capabilities, provided, for example, by the global positioning system (GPS) or other type of satellite navigation system. The eNB may notice that dUE1 and dUE2 are in proximity to each other via the GPS data.

"Proximity" may be defined in a number of different manners that may use the capabilities of dUE1 and dUE2. For some UEs, a distance of 100 meters may be used as a criteria (in other words, D2D communication would be allowed if dUE1 and dUE2 are within 100 meters of each other). Other UEs with more powerful transceivers may be capable of D2D transmissions within 1 kilometer or even more. The location of the dUEs may be determined in a number of other ways. For example, via calculating the time of flight of signals from the eNB to each dUE. The eNB may determine that dUE1 wishes to communicate with dUE2 in a variety of different ways. In addition to merely being near each other, the eNB may use other criteria to determine that dUE1 and dUE2 would benefit from a D2D connection. For example, the eNB may determine that one or both of dUE1 and dUE2 are capable of D2D communication and that dUE1 and dUE2 are either in communication with each other or seeking to initiate communication with each other. The rough proximity of UEs can be determined by other positioning methods such as observed time distance of arrival (OTDOA), cell ID based positioning, and the like. The D2D communication may be also used in public safety scenarios, because some networks may not be fully operational in the event of a natural disaster.

Thereafter, the eNB schedules a D2D discovering allocation for dUE1 and dUE2 (204). This entails the eNB scheduling dUE1 to transmit the D2D discovery signal using PUCCH format 1. In addition, the eNB informs dUE2 of the scheduled D2D discovering allocation.

Thereafter, dUE1 and dUE2 start the D2D discovery process. First, dUE1 transmits a D2D discovery signal using a PUCCH format 1 during the D2D grant from eNB (206). The discovery signal may have one of a variety of different formats. For example, an existing PUCCH format may be used with an on-off keying method. The exact format may differ, as any type of signal format may be used for this signal.

Then, dUE2 listens to the D2D discovery signal transmitted from dUE1 using the SR on-off key detection on the corresponding PUCCH resource (208).

The proximity detection is considered successful if dUE2 can detect the D2D discovery signal transmitted by dUE1 and the derived channel quality exceeds a threshold. dUE2 then informs the eNB and/or dUE1 of the detection result for potential traffic offloading (210). This informing may comprise dUE2 sending a report to the eNB and/or dUE1. If the proximity detection succeeds, the traffic between dUE1 and dUE2 can be offloaded onto a d2D link (212). Otherwise (i.e., the proximity detection fails), the traffic between dUE1 and dUE2 remains on the regular LTE data network (214).

The same concept may be extended to groups of UEs by including additional information. For example, the D2D discovering allocation may be identified by the radio network temporary identifier (RNTI) of a dUE (D2D-RNTI or D-RNTI) and the initiating dUE-ID. The use of D-RNTI (instead of a cell radio network temporary identifier (C-RNTI)) allows further extending of the discovering allocation to be shared among a group (and not only a pair) of D2D UEs. The UE identified by the dUE-ID will transmit the discovering signal (using PUCCH format 1) while other UEs sharing the same D-RNTI will attempt to receive the scheduled discovering signal.

In the alternative, the discovery process can be autonomously initiated by any dUE among a D2D cluster.

Figure 3:
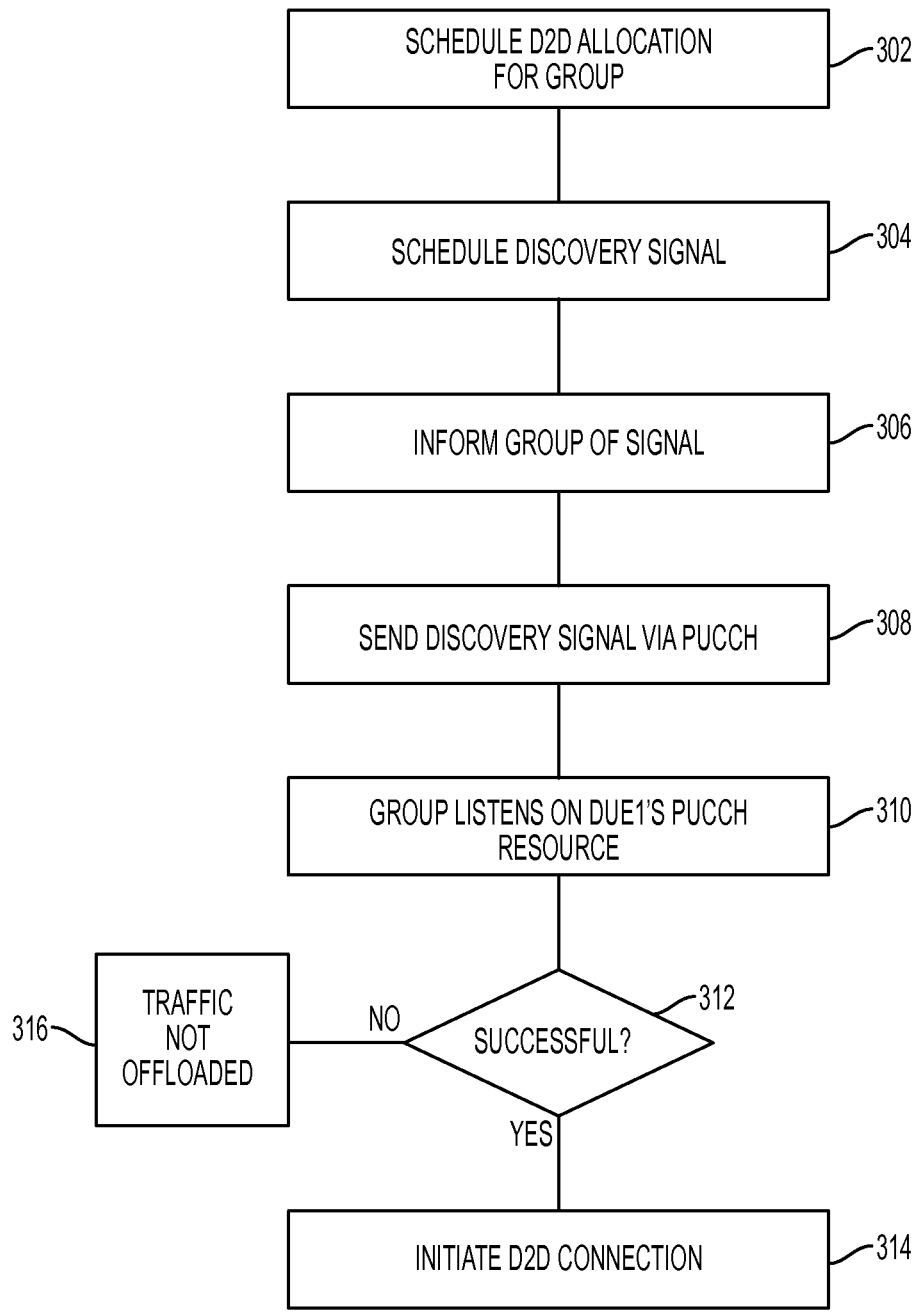
FIG. 3 is a flowchart illustrating the operation of another embodiment.

With reference to FIG. 3, this method could be extended to efficiently facilitate a group of D2D UEs to conduct discovery to improve the signal efficiency of D2D discovery. The eNB schedules a D2D discovering allocation for a group of D2D-capable UEs (302). The eNB may explicitly identify dUE1 as the initiating UE. Thereafter, the eNB schedules dUE1 to transmit the D2D discovery signal using PUCCH format 1 (304). Then the eNB informs the D2D UE group about the scheduled D2D discovery signal allocation (306).

After dUE1 transmits a D2D discovery signal using PUCCH format 1 (308), the other UEs in the D2D UE group listen to the D2D discovery signal transmitted from dUE1 using the SR on-off key detection on the corresponding PUCCH resource of dUE1 (310).

If at least one UE in the D2D UE group successfully detects the D2D discovery signal from dUE1, the D2D proximity detection is considered successful and the UE in the D2D UE group may inform eNB and/or dUE1 about the detection (312).

The D2D data transmission can be initiated after a successful D2D proximity detection between either UE in the D2D UE group and dUE1 (314). If the D2D proximity detection failed, the data communication between dUE1 and the target UE will be scheduled using the regular LTE data transmission mode rather than D2D mode (316).

Figure 4:
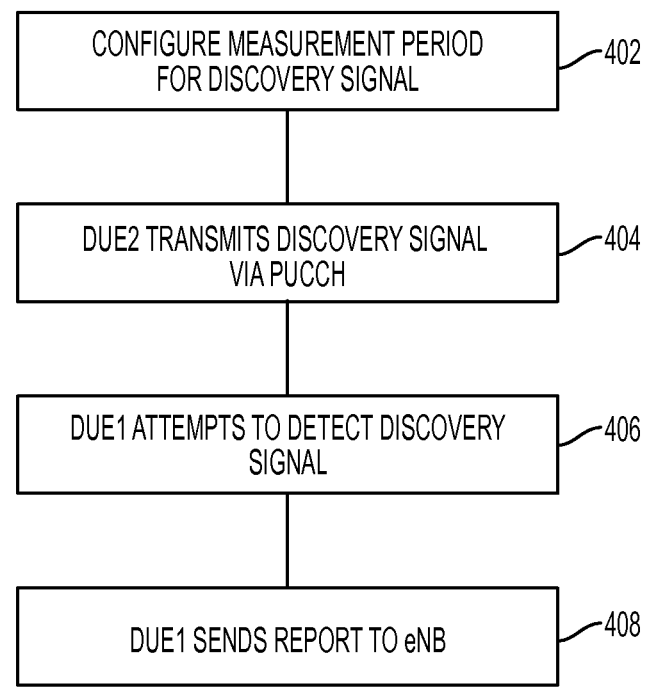
FIG. 4 is a flowchart illustrating the operation of another embodiment.

With reference to FIG. 4, a flow chart illustrating the operation of another embodiment is presented. The eNB may configure the measurement period for a D2D discovery signal to a dUE1 (402). The eNB can further provide information regarding which discovery signal is to be used for the D2D discovery signal (e.g., SR resource, SR configuration index, C-RNTI or D-RNTI).

During this measurement period, the dUE1 may try to detect the signal based on the configured information. This may be a blind detection in that the eNB may configure dUE2 to send the D2D discovery signal in advance. dUE2 may thus be configured to send the discovery signal in an autonomous manner. dUE1 should thus be ready to detect a signal in this scenario.

The eNB may configure a D2D discovery signal resource for a dUE2 by transmitting PUCCH resource $n_{PUCCH,SRI}^{(1,p)}$ and configuration index as shown in the table in FIG. 6. In FIG. 6, column 610 is the SR configuration index, $I_{SR}$; column 620 is the SR periodicity in milliseconds; and column 630 is the SR subframe offset. Thus, the D2D discovery signal configuration may be similar to for the SR, comprising the subframe offset and the periodicity. It should be understood that FIG. 6 is merely showing exemplary values and other values may be used.

The transmission of the D2D discovery signal may be selected in a part of the configured subframes in a predetermined manner, set forth beforehand by the eNB. In the alternative, the transmission of the D2D discovery signal may be autonomous. One such autonomous method may be to randomly select a subframe offset and corresponding periodicity. With either method, the transmission of the D2D discovery signal may occur at every potential SR subframe. For example, if the SR subframe is configured to occur at every fifth subframe, then the transmission of the D2D discovery signal may also occur at every fifth subframe.

Returning to FIG. 4, the dUE2 may transmit a D2D discovery signal using PUCCH format 1 with configured SR resource and SR configuration index at every potential SR subframe (404). Alternatively, the dUE2 may select a part of potential SR subframe in which to transmit a D2D discovery signal in a predetermined manner or in an autonomous manner. The dUE1 then attempts to detect dUE2's D2D discovery signal with the configured SR resource and SR configuration index (406).

After finishing the detection during measurement gap (if given), the dUE1 may report the measurements it made to the eNB (408). The report may contain information about whether the detection was successful or not for the eNB to decide whether dUE1 and dUE2 are in proximity. The report may also contain signal quality information of the detected signal for the eNB to decide whether the detection report is reliable or not. The report may also contain the time value of the detected signal within a periodicity in reference to the starting timing of a radio frame for DL of the serving cell (typically this serving cell can be primary cell if carrier aggregation is applied). The time value of the detected signal may be in multiple integers of $T_s$ (i.e., $m*T_s$ where m is an integer value) and where $$T_s = \frac{1}{15000 \times 2048}).$$

Alternatively, eNB may configure the reference serving cell. This information may help eNB to determine how close the DUEs are to determine if dUE1 and dUE2 should enter into a D2D connection.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 5:
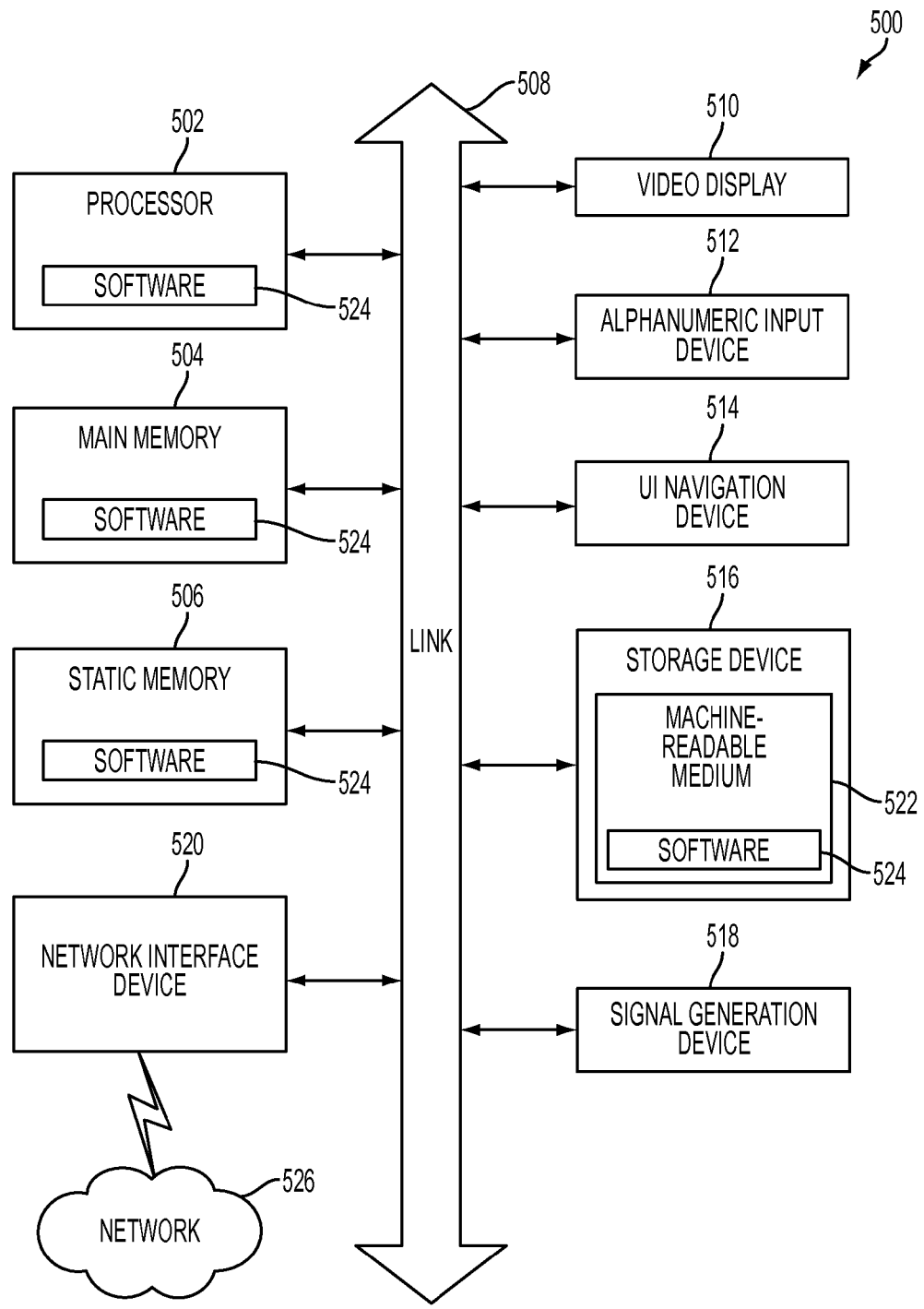
FIG. 5 is a block diagram illustrating an exemplary machine capable of performing an embodiment.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a smartphone, a web appliance, a network router, switch or bridge, a dedicated navigation device, laptop computers, a television, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse or track pad). In an example, the display device 510, input device 512 and UI navigation device 514 may be a touch screen display that accomplishes all three tasks. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that is arranged to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM, DVD-ROM, and Blu-Ray disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The following examples pertain to further embodiments.

Example 1 is a method for facilitating the establishment of a device-to-device (D2D) connection in a long term evolution (LTE) network comprising: scheduling a first user equipment (UE) to transmit a D2D discovery signal via a physical uplink control channel (PUCCH), using PUCCH format 1; informing a second UE of the D2D discovery signal using PUCCH format 1; determining if the second UE is able to detect the D2D discovery signal; and if the second UE is able to detect the D2D discovery signal, then establishing a D2D connection between the first UE and the second UE.

In example 2, the method of example 1 may optionally include wherein the D2D discovery signal is transmitted using PUCCH format 1.

In example 3, the method of example 1 may optionally include wherein determining if the second UE is able to detect the D2D discovery signal comprises receiving a report from the second UE, the report comprising information regarding the ability of the second UE to detect the D2D discovery signal.

In example 4, the method of example 3 may optionally include wherein the report further comprises channel quality information between the first UE and the second UE.

In example 5, the method of example 4 may optionally include wherein determining if the second UE is able to detect the D2D discovery signal further comprises comparing the channel quality information to a predetermined threshold.

In example 6, the method of example 1 may optionally include wherein the second UE is a member of a group of UEs.

In example 7, the method of example 6 may optionally further comprise: determining if there are other UEs in the group of UEs that are able to detect the D2D discovery signal on the PUCCH; and establishing a D2D connection between the first UE and any UE of the group of UEs that is able to detect the D2D discovery signal.

In example 8, the method of example 1 may optionally include wherein informing a second UE of the D2D discovery signal via a PUCCH comprises: configuring a measurement period of the PUCCH; and providing information regarding which signal is to be used in the PUCCH; wherein the signal to be used is chosen from scheduling request (SR) resource, SR configuration index, cell radio network temporary identifier (C-RNTI), and D2D radio network temporary identifier (D-RNTI).

In example 9, the method of example 1 may optionally include wherein scheduling a first user equipment (UE) to transmit a D2D discovery signal using a physical uplink control channel (PUCCH) format 1 comprises scheduling the first UE to transmit the D2D discovery signal at every potential scheduling request (SR) subframe at a predetermined SR resource and SR configuration index.

Example 10 is an evolved node B (eNB) arranged to facilitate the establishment of a device-to-device (D2D) connection in a long term evolution (LTE) network comprising: a processor; a transceiver coupled to the processor and arranged to transmit and receive signals via an antenna assembly; wherein the processor is arranged to: schedule a first user equipment (UE) to transmit a D2D discovery signal via a physical uplink control channel (PUCCH), wherein scheduling the first UE is accomplished by transmitting a signal to the first UE via the transceiver; inform a second UE of the D2D discovery signal sent via the PUCCH, wherein informing the second UE is accomplished by transmitting a signal to the second UE via the transceiver; determine if the second UE is able to detect the D2D discovery signal; if the second UE is able to detect the D2D discovery signal, then establish a D2D connection between the first UE and the second UE; and if the second UE is not able to detect the D2D discovery signal, serving the first UE and the second UE via LTE couplings from the eNB to the first UE and to the second UE.

In example 11, the eNB of example 10 may optionally include wherein determining if the second UE is able to detect the D2D discovery signal comprises receiving a report from the second UE, the report comprising information regarding the ability of the second UE to detect the D2D discovery signal.

In example 12, the eNB of example 11 may optionally include wherein the report further comprises channel quality information between the first UE and the second UE.

In example 13, the eNB of example 12 may optionally include wherein determining if the second UE is able to detect the D2D discovery signal further comprises comparing the channel quality information to a predetermined threshold.

In example 14, the eNB of example 10 may optionally include wherein the second UE is a member of a group of UEs.

In example 15, the eNB of example 14 may optionally include wherein the processor is further arranged to: determine if there are other UEs in the group of UEs that are able to detect the D2D discovery signal on the PUCCH; and establish a D2D connection between the first UE and any UE of the group of UEs that is able to detect the D2D discovery signal.

In example 16, the eNB of example 10 may optionally include wherein informing a second UE of the D2D discovery signal using PUCCH format 1 comprises: configuring a measurement period of the PUCCH; and providing information regarding which signal is to be used in the PUCCH; wherein the signal to be used is chosen from scheduling request (SR) resource, SR configuration index, cell radio network temporary identifier (C-RNTI), and D2D radio network temporary identifier (D-RNTI).

In example 17, the eNB of example 10 may optionally include wherein scheduling a first user equipment (UE) to transmit a D2D discovery signal using a physical uplink control channel (PUCCH) format 1 comprises scheduling the first UE to transmit the D2D discovery signal at every potential scheduling request (SR) subframe at a predetermined SR resource and SR configuration index.

In example 18, The eNB of example 10 may optionally include wherein the D2D discovery signal is scheduled to be sent via PUCCH using PUCCH format 1.

Example 19 is a method performed by a user equipment (UE) for facilitating the establishment of a device-to-device (D2D) connection in a long term evolution (LTE) network comprising: receiving instructions from a network to transmit a D2D discovery signal; transmitting a D2D discovery signal via a physical uplink control channel (PUCCH); and if a second UE is able to detect the D2D discovery signal, establishing a D2D connection with the second UE.

In example 20, the method of example 19 may optionally include wherein the instructions comprise: a predetermined scheduling request (SR) resource and SR configuration index.

In example 21, the method of example 20 may optionally include wherein transmitting a D2D discovery signal comprises: transmitting the D2D discovery signal at every potential SR subframe at the predetermined SR resource and SR configuration index.

In example 22, the method of example 19 may optionally include wherein the D2D discovery signal is chosen from a scheduling request (SR) resource, SR configuration index, cell radio network temporary identifier (C-RNTI), and D2D radio network temporary identifier (D-RNTI).

In example 23, the method of example 19 may optionally include wherein the D2D discovery signal sent via PUCCH is sent using PUCCH format 1.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

We claim:

1. A method for facilitating the establishment of a device-to-device (D2D) connection in a long term evolution (LTE) network comprising:
    detecting, by an evolved NodeB (eNB) a possibility to offload communications to D2D communications between a first user equipment (UE) and a second UE based at least in part on a proximity of the first UE to the second UE being within a threshold range;
    scheduling, by the eNB, the first UE to transmit a D2D discovery signal via a physical uplink control channel (PUCCH) during a D2D grant from the eNB;
    informing a second UE of the D2D discovery signal, wherein the informing comprises configuring a measurement period of the PUCCH;
    determining if the second UE is able to detect the D2D discovery signal; and
    if the second UE is able to detect the D2D discovery signal, then establishing a D2D connection between the first UE and the second UE.

2. The method of claim 1 wherein the D2D discovery signal is transmitted using PUCCH format 1.

3. The method of claim 1 wherein determining if the second UE is able to detect the D2D discovery signal comprises receiving a report from the second UE, the report comprising information regarding the ability of the second UE to detect the D2D discovery signal.

4. The method of claim 3 wherein the report further comprises channel quality information between the first UE and the second UE.

5. The method of claim 4 wherein determining if the second UE is able to detect the D2D discovery signal further comprises comparing the channel quality information to a predetermined threshold.

6. The method of claim 1 wherein the second UE is a member of a group of UEs.

7. The method of claim 6 further comprising:
    determining if there are other UEs in the group of UEs that are able to detect the D2D discovery signal sent via PUCCH; and
    establishing a D2D connection between the first UE and any UE of the group of UEs that is able to detect the D2D discovery signal.

8. The method of claim 1 wherein informing a second UE of the D2D discovery signal further comprises
    providing information regarding which signal is to be used in the PUCCH; wherein the signal to be used is chosen from scheduling request (SR) resource, SR configuration index, cell radio network temporary identifier (C-RNTI), and D2D radio network temporary identifier (D-RNTI).

9. The method of claim 1 wherein scheduling a first user equipment (UE) to transmit a D2D discovery signal using a physical uplink control channel (PUCCH) comprises scheduling the first UE to transmit the D2D discovery signal at every potential scheduling request (SR) subframe at a predetermined SR resource and SR configuration index.

10. An evolved node B (eNB) arranged to facilitate the establishment of a device-to-device (D2D) connection in a long term evolution (LTE) network comprising:
    a processor;
    an antenna assembly; and
    a transceiver coupled to the processor, wherein the transceiver is arranged to transmit and receive signals via the antenna assembly;
    wherein the processor is arranged to:
        detect a possibility to offload communications to D2D communications between a first user equipment (UE) and a second UE based at least in part on a proximity of the first UE to the second UE being within a threshold range;
        schedule the first UE to transmit a D2D discovery signal via a physical uplink control channel (PUCCH) during a D2D grant from the eNB, wherein scheduling the first UE is accomplished by transmitting a signal to the first UE via the transceiver;
        inform a second UE of the D2D discovery signal sent via the PUCCH, wherein informing the second UE is accomplished by transmitting a signal to the second UE via the transceiver, and wherein the informing comprises configuring a measurement period of the PUCCH;
        determine if the second UE is able to detect the D2D discovery signal;
        if the second UE is able to detect the D2D discovery signal, then establish a D2D connection between the first UE and the second UE; and
        if the second UE is not able to detect the D2D discovery signal, serving the first UE and the second UE via LTE couplings from the eNB to the first UE and to the second UE.

11. The eNB of claim 10 wherein determining if the second UE is able to detect the D2D discovery signal comprises receiving a report from the second UE, the report comprising information regarding the ability of the second UE to detect the D2D discovery signal.

12. The eNB of claim 11 wherein the report further comprises channel quality information between the first UE and the second UE.

13. The eNB of claim 12 wherein determining if the second UE is able to detect the D2D discovery signal further comprises comparing the channel quality information to a predetermined threshold.

14. The eNB of claim 10 wherein the second UE is a member of a group of UEs.

15. The eNB of claim 14 wherein the processor is further arranged to:
    determine if there are other UEs in the group of UEs that are able to detect the D2D discovery signal on the PUCCH, and
    establish a D2D connection between the first UE and any UE of the group of UEs that is able to detect the D2D discovery signal.

16. The eNB of claim 10 wherein informing a second UE of the D2D discovery signal via PUCCH further comprises
    providing information regarding which signal is to be used in the PUCCH, wherein the signal to be used is chosen from scheduling request (SR) resource, SR configuration index, cell radio network temporary identifier (C-RINTI), and D2D radio network temporary identifier (D-RNTI).

17. The eNB of claim 10 wherein scheduling a first user equipment (UE) to transmit a D2D discovery signal via a physical uplink control channel (PUCCH) comprises scheduling the first UE to transmit the D2D discovery signal at every potential scheduling request (SR) subframe at a predetermined SR resource and SR configuration index.

18. The eNB of claim 10 wherein the D2D discovery signal is scheduled to be sent via PUCCH using PUCCH format 1.

19. A method performed by a user equipment (UE) for facilitating the establishment of a device-to-device (D2D) connection in a long term evolution (LTE) network comprising:

providing positioning information to a network;
responsive to providing the positioning information, receiving instructions from the network to transmit a D2D discovery signal;
transmitting a D2D discovery signal via a physical uplink control channel (PUCCH) during a D2D grant from the network; and
if a second UE is able to detect the D2D discovery signal, establishing a D2D connection with the second UE, wherein the second UE is informed, by an evolved node B (eNB), of the D2D discovery signal sent via the PUCCH, and wherein the informing comprises configuring a measurement period of the PUCCH.

20. The method of claim 19 wherein the instructions comprise:

a predetermined scheduling request (SR) resource and SR configuration index.

21. The method of claim 20 wherein transmitting a D2D discovery signal comprises:

transmitting the D2D discovery signal at every potential SR subframe at the predetermined SR resource and SR configuration index.

22. The method of claim 19 wherein the D2D discovery signal is chosen from a scheduling request (SR) resource, SR configuration index, cell radio network temporary identifier (C-RNTI), and D2D radio network temporary identifier (D-RNTI).

23. The method of claim 19 wherein the D2D discovery signal sent via PUCCH is sent using PUCCH format 1.

\* \* \* \* \*

UNITED STATES PATENT AND TRADEMARK OFFICE
CERTIFICATE OF CORRECTION

| | |
|---|---|
| PATENT NO. | : 9,924,432 B2 |
| APPLICATION NO. | : 14/126998 |
| DATED | : March 20, 2018 |
| INVENTOR(S) | : Fwu et al. |

Page 1 of 1

It is certified that error appears in the above-identified patent and that said Letters Patent is hereby corrected as shown below:

In the Claims

In Column 16, Line 56, in Claim 15, delete "PUCCH," and insert --PUCCH;-- therefor In Column 16, Line 66, in Claim 16, delete "(C-RINTI)," and insert --(C-RNTI),-- therefor Signed and Sealed this
Fourth Day of June, 2019

Andrei Iancu
*Director of the United States Patent and Trademark Office*